(12) United States Patent
Picard et al.

(10) Patent No.: US 11,827,791 B2
(45) Date of Patent: Nov. 28, 2023

(54) RUBBER COMPOSITION AND A TIRE

(71) Applicant: The Goodyear Tire & Rubber Company, Akron, OH (US)

(72) Inventors: Virginie Elyane Michelle Catherine Picard, Bastogne (BE); Jérôme Joel Daniel Delville, Réhon (FR); Pascal Patrick Steiner, Vichten (LU); Malik Djelloul-Mazouz, Bereldange (LU)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 59 days.

(21) Appl. No.: 17/657,273

(22) Filed: Mar. 30, 2022

(65) Prior Publication Data

US 2023/0002594 A1     Jan. 5, 2023

Related U.S. Application Data

(60) Provisional application No. 63/158,536, filed on Mar. 9, 2021.

(51) Int. Cl.
     *C08L 9/06*      (2006.01)

(52) U.S. Cl.
     CPC ........... *C08L 9/06* (2013.01); *C08L 2205/025* (2013.01); *C08L 2205/035* (2013.01)

(58) Field of Classification Search
     CPC ........................................................ C08L 9/06
     USPC ........................................................ 524/505
     See application file for complete search history.

(56) References Cited

U.S. PATENT DOCUMENTS

| | | | |
|---|---|---|---|
| 5,901,766 | A | 5/1999 | Sandstrom et al. |
| 9,441,098 | B1 | 9/2016 | Isitman et al. |
| 9,757,987 | B2 | 9/2017 | Jacoby et al. |
| 10,364,342 | B2 | 7/2019 | Brace |
| 10,519,300 | B2 | 12/2019 | Brace |
| 10,821,777 | B2 | 11/2020 | Isitman et al. |
| 2013/0338256 | A1 | 12/2013 | Steiner et al. |
| 2016/0376427 | A1 | 12/2016 | Sandstrom et al. |
| 2017/0037225 | A1 | 2/2017 | Isitman et al. |
| 2017/0051135 | A1 | 2/2017 | Sandstrom et al. |
| 2017/0166732 | A1 | 6/2017 | Isitman et al. |
| 2017/0232795 | A1 | 8/2017 | Isitman et al. |
| 2018/0154696 | A1 | 6/2018 | Isitman et al. |
| 2019/0062534 | A1* | 2/2019 | Broemmel ............... C08L 9/06 |
| 2019/0062537 | A1* | 2/2019 | Mejia .................. C08K 5/5419 |
| 2019/0225778 | A1 | 7/2019 | Weydert et al. |
| 2019/0330452 | A1 | 10/2019 | Isitman et al. |
| 2020/0048439 | A1 | 2/2020 | Ganesan et al. |
| 2020/0062034 | A1 | 2/2020 | Broemmel |
| 2020/0071506 | A1 | 3/2020 | Steiner |
| 2020/0094623 | A1 | 3/2020 | Isitman et al. |

FOREIGN PATENT DOCUMENTS

| | | |
|---|---|---|
| EP | 2455232 A1 | 5/2012 |
| EP | 3031621 A1 | 6/2016 |
| EP | 3228659 A1 | 10/2017 |
| EP | 3450203 A1 | 3/2019 |
| EP | 3450206 A1 | 3/2019 |

OTHER PUBLICATIONS

European Search Report for Serial No. EP22159706 dated Jul. 18, 2022.

* cited by examiner

*Primary Examiner* — Deve V Hall
(74) *Attorney, Agent, or Firm* — Mandy B. Willis

(57) ABSTRACT

In a first aspect, the present invention is directed to a rubber composition comprising 70 phr to 90 phr of styrene butadiene rubber, wherein said styrene butadiene rubber comprises a first styrene butadiene rubber having a glass transition temperature within a range of −49° C. to −15° C. and a second styrene butadiene rubber having a glass transition temperature within a range of −50° C. to −89° C. Furthermore, the rubber composition comprises from 10 phr to 30 phr of one or more of natural rubber and synthetic polyisoprene rubber, 100 phr to 200 phr of silica, and at least 25 phr of at least one terpene resin having a weight average molecular weight (Mw) of at most 1000 g/mol. Moreover, the invention is directed to a tire comprising such a rubber composition, in particular in the tread of the tire.

19 Claims, 1 Drawing Sheet

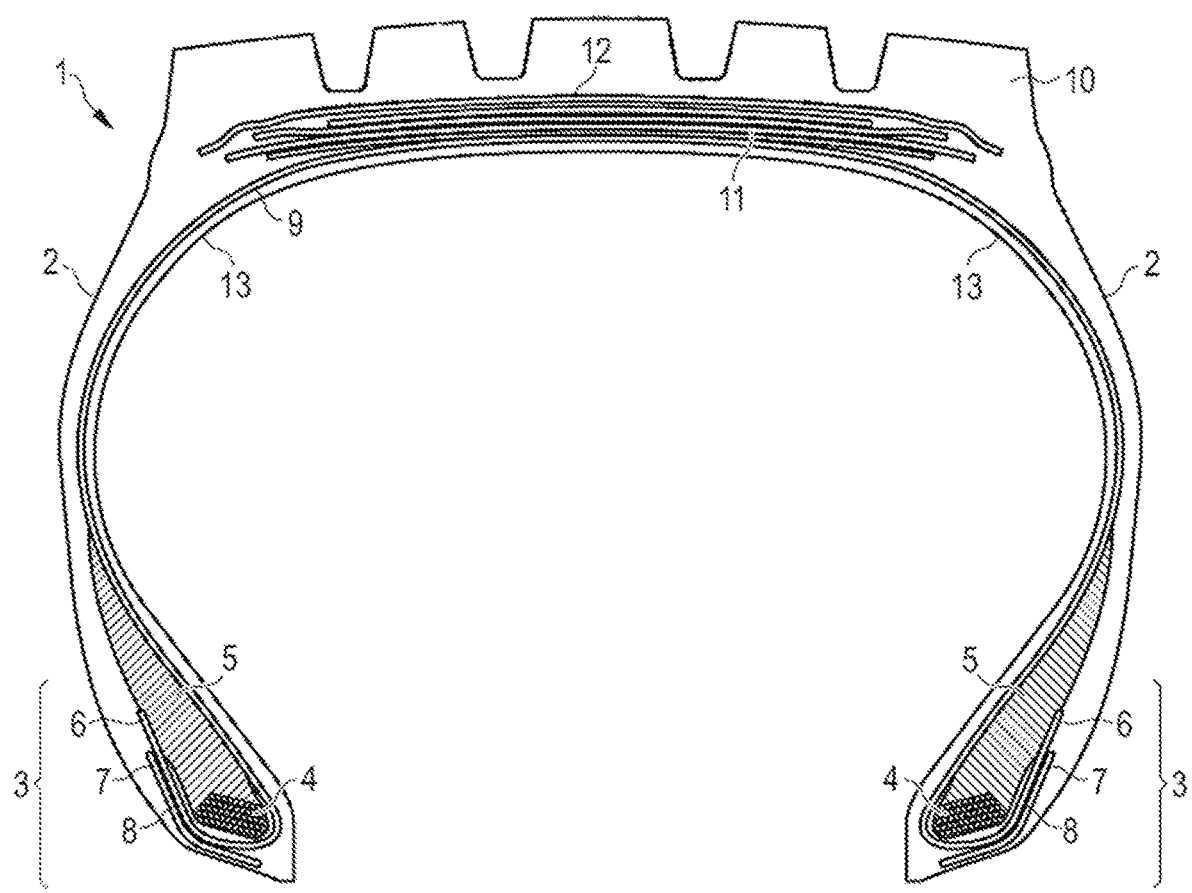

RUBBER COMPOSITION AND A TIRE

FIELD OF THE INVENTION

The present invention is directed to a rubber composition, in particular a tread rubber composition, and a tire comprising a rubber composition, especially a tire having a tread with said rubber composition.

BACKGROUND

As known in the tire art, it has traditionally been difficult to improve multiple tire characteristics at the same time without considerable trade-offs in at least another characteristic. One of such conflicts exists between rolling resistance and wet performance. When rolling resistance is to be improved, there are typically trade-offs in wet grip. However, limiting rolling resistance is crucial to increase energy efficiency. Moreover, even modern very low rolling resistance summer tires shall have advanced wet and dry handling performance, including wet and dry braking.

Despite significant developments in compound technology, significant room for improvement still remains to improve said properties.

SUMMARY OF THE INVENTION

A first object of the invention may be to provide a rubber composition allowing for improved rolling resistance at good wet braking and/or dry braking performance.

A second object of the present invention may be to provide a tire with improved rolling resistance properties as well as improved wet and/or dry performance.

The present invention is defined by the scope of the independent claims. Preferred embodiments are provided in the dependent claims as well as in the summary of the invention hereinbelow.

Thus, in a first aspect of the invention, the present invention is directed to a rubber composition comprising 70 phr to 90 phr of styrene butadiene rubber comprising a first styrene butadiene rubber having a glass transition temperature within a range of −49° C. to −15° C. and a second styrene butadiene rubber having a glass transition temperature within a range of −50° C. to −89° C. Preferably, said styrene butadiene rubber is a solution-polymerized styrene butadiene rubber. Moreover, the rubber composition comprises from 10 phr to 30 phr of one or more of natural rubber and synthetic polyisoprene, 100 phr to 200 phr of silica, and at least 25 phr of (at least one) terpene resin having a weight average molecular weight (Mw) of at most 1000 g/mol.

Such a relatively high loaded silica composition comprising natural rubber/synthetic polyisoprene as well as high and low glass transition temperature styrene butadiene rubbers in combination with the claimed terpene resin has been found to be an advanced way of providing a balanced composition achieving limited rolling resistance and also good wet and dry braking performance.

In still another embodiment, the resin has a softening point within a range of 100° C. to 150° C. and/or a weight average molecular Mw within a range of 500 g/mol to 1000 g/mol. Higher molecular weights have turned out to be less desirable in the present invention.

In one embodiment, the silica has a BET surface area within a range of 130 m$^2$/g to 200 m$^2$/g, preferably 150 m$^2$/g to 190 m$^2$/g. In particular, the inventors have found that higher surface area silicas are less desirable in the present composition.

In still another embodiment, said resin is an alpha pinene terpene resin or in other words a terpene resin based on alpha pinenes. In particular, terpene phenol resins have been found to be less preferable.

In still another embodiment, the rubber composition comprises from 110 phr, or preferably from 115 phr, to 145 phr of the silica. In particular, higher filler loads are not desirable in this embodiment in view of balanced abrasion properties and limited rolling resistance.

In still another embodiment, the present rubber composition comprises from 0.1 phr to 10 phr of carbon black. Preferably, the rubber composition comprises from 0.2 to 5 phr of carbon black.

In yet another embodiment, the rubber composition comprises from 10 phr to 20 phr of at least one silane. In particular, the rubber composition may comprise from 10 phr to 20 phr of a blocked mercapto silane, such as 3-Octanoylthio-1-propyltriethoxysilane.

In yet another embodiment, the amount of liquid plasticizers (such as oils, liquid diene-based polymers or liquid resins) is at most 9 phr. Higher plasticizer loads are not desired in this embodiment.

In still another embodiment, the rubber composition comprises from 11 phf to 15 phf of the blocked mercapto silane, wherein phf is, as usual in the tire art, parts by weight per hundred parts by weight of filler. Thus, the silane amount in the present embodiment is high compared with typical examples from the prior art. Amongst others, it has been found by the inventors that rolling resistance and tensile properties are improved.

In still another embodiment, the composition comprises from 0 phr to 7 phr of oil, preferably from 0 phr to 6 phr or from 1 phr to 6 phr of oil.

In yet another embodiment, said styrene butadiene rubber comprises at least 10 phr more of the second styrene butadiene rubber than of the first styrene butadiene rubber, and at least 10 phr, or preferably at least 20 phr, of the first styrene butadiene rubber; and/or the rubber composition comprises from 20 phr to 40 phr of the first styrene butadiene rubber and from 40 phr to 60 phr of the second styrene butadiene rubber.

In still another embodiment, the rubber composition comprises from 15 phr to 25 phr of natural rubber or synthetic polyisoprene, preferably natural rubber.

In another embodiment, one or more of the first styrene butadiene rubber and the second styrene butadiene rubber comprises at least one functional group configured for the coupling to the silica. Preferably, both styrene butadiene rubbers have at least one functional group configured for the coupling to silica. Preferably, these functional groups are provided at the rubbers' chain ends.

In still another embodiment, one of the first styrene butadiene rubber and the second styrene butadiene rubber is end-chain-functionalized with an amino silane group (at least one of its chain ends, optionally at both chain ends), and wherein the other one of the first styrene butadiene rubber and the second styrene butadiene rubber is end-chain-functionalized with an amino siloxane group (at at least one of its chain ends, optionally at both).

In still another embodiment, the first styrene butadiene rubber has a glass transition temperature within a range of −25° C. to −40° C. and/or the second styrene butadiene rubber has a glass transition temperature within a range of −51° C. to −69° C.

In still another embodiment, the first styrene butadiene rubber has a bound styrene content within a range of 5% to 50%, preferably 10% to 35%, and most preferably 15% to 35%; and/or the second styrene butadiene rubber has a bound styrene content within a range of 5% to 30%, preferably 5% to 15%.

In yet another embodiment, the rubber composition comprises from 30 phr to 50 phr of the resin, preferably from 35 phr to 45 phr of the resin.

In still another embodiment, the glass transition temperature of the rubber composition is within a range of −25° C. and −15° C.

In an embodiment, the rubber composition may include an additional diene-based rubber. Some representative examples of such additional diene-based rubbers include synthetic polymers which are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g. acrolein, methyl isopropenyl ketone and vinylethyl ether. Specific examples of synthetic rubbers include neoprene (polychloroprene), polybutadiene (including cis 1,4-polybutadiene), polyisoprene (including cis 1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. Preferred rubber or elastomers may be in general natural rubber, synthetic polyisoprene, polybutadiene and SBR including SSBR.

In another embodiment, an emulsion polymerization derived styrene/butadiene (ESBR) might be used having a styrene content of 20 to 28 percent bound styrene or, for some applications, an ESBR having a medium to relatively high bound styrene content, namely, a bound styrene content of 30 to 45 percent. In many cases the ESBR will have a bound styrene content which is within the range of 26 to 31 percent. By emulsion polymerization prepared styrene-butadiene rubber (ESBR), it may be meant that styrene and 1,3-butadiene are copolymerized as an aqueous emulsion. Such are well known to those skilled in such art. The bound styrene content can vary, for example, from 5 to 50 percent. In one aspect, the ESBR may also contain acrylonitrile to form a terpolymer rubber, as ESBAR, in amounts, for example, of 2 to 30 weight percent bound acrylonitrile in the terpolymer. Emulsion polymerization prepared styrene/butadiene/acrylonitrile copolymer rubbers containing 2 to 40 weight percent bound acrylonitrile in the copolymer may also be contemplated as diene-based rubbers.

In another embodiment, solution polymerization prepared (or solution polymerized) SBR (SSBR) may be used. Such an SSBR, e.g. according to the above embodiments, can be conveniently prepared, for example, by anionic polymerization in an inert organic solvent. More specifically, the SSBR can be synthesized by copolymerizing styrene and 1,3-butadiene monomer in a hydrocarbon solvent utilizing an organo lithium compound as the initiator. In still another embodiment, the solution styrene butadiene rubber is a tin-coupled polymer. In still another embodiment, the SSBR is functionalized for improved compatibility with silica. In addition, or alternatively, the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In one embodiment, a synthetic or natural polyisoprene rubber may be used. Synthetic cis-1,4-polyisoprene and natural rubber are as such well known to those having skill in the rubber art. In particular, the cis 1,4-microstructure content may be at least 90% and is typically at least 95% or even higher.

In one embodiment, cis-1,4-polybutadiene rubber (BR or PBD) is additionally used. Suitable polybutadiene rubbers may be prepared, for example, by organic solution polymerization of 1,3-butadiene. The BR may be conveniently characterized, for example, by having at least a 90 percent cis-1,4-microstructure content ("high cis" content) and a glass transition temperature (Tg) in a range of from −95 to −110° C. Suitable polybutadiene rubbers are available commercially, such as Budene® 1207, Budene® 1208, Budene® 1223, or Budene® 1280 from The Goodyear Tire & Rubber Company. These high cis-1,4-polybutadiene rubbers can for instance be synthesized utilizing nickel catalyst systems which include a mixture of (1) an organonickel compound, (2) an organoaluminum compound, and (3) a fluorine containing compound as described in U.S. Pat. Nos. 5,698,643 and 5,451,646, which are incorporated herein by reference. Alternatively, the compound is essentially free or completely free of PBD.

A glass transition temperature, or Tg, of an elastomer or elastomer composition, where referred to herein, represents the glass transition temperature(s) of the respective elastomer or elastomer composition in its uncured state or in a cured state in the case of an elastomer composition. A Tg is determined herein as a peak midpoint by a differential scanning calorimeter (DSC) at a temperature rate of increase of 10° C. per minute, according to ASTM D3418.

The term "phr" as used herein, and according to conventional practice, refers to "parts by weight of a respective material per 100 parts by weight of rubber, or elastomer". In general, using this convention, a rubber composition is comprised of 100 parts by weight of rubber/elastomer. The claimed composition may comprise other rubbers/elastomers than explicitly mentioned in the claims, provided that the phr value of the claimed rubbers/elastomers is in accordance with claimed phr ranges and the amount of all rubbers/elastomers in the composition results in total in 100 parts of rubber. In an example, the composition may further comprise from 1 phr to 10 phr, optionally from 1 phr to 5 phr, of one or more additional diene-based rubbers, such as SBR, SSBR, ESBR, PBD/BR, NR and/or synthetic polyisoprene. In another example, the composition may include less than 5 phr, preferably less than 3 phr, of an additional diene-based rubber or be also essentially free of such an additional diene-based rubber. The terms "compound", "composition" and "formulation" may be used herein interchangeably, unless indicated otherwise.

In another embodiment, the rubber composition includes one or more resins, preferably having a glass transition temperature Tg greater than 20° C., preferably greater than 60° C. in accordance with another embodiment of the present invention. A Tg for resins is determined as a peak midpoint by a differential scanning calorimeter (DSC) at a temperature rate of increase of 10° C. per minute, according to ASTM D6604 or equivalent. Preferably, the resin has a softening point above 100° C. as determined by ASTM E28 which might sometimes be referred to as a ring and ball softening point.

Terpene resins are preferably comprised of polymers of at least one of limonene, alpha pinene, beta pinene and delta-3-carene, whereas terpene-phenol resins may be derived by copolymerization of phenolic monomers with terpenes such as limonenes, pinenes and delta-3-carene.

In an embodiment, the rubber composition may also include oil, in particular processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils may include various oils as are known in the art, including aromatic, paraffinic, naphthenic, vegetable oils, and low PCA oils, such as MES, TDAE, SRAE and heavy naphthenic oils. Suitable low PCA oils may include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Some representative examples of vegetable oils that can be used include soybean oil, sunflower oil, canola (rapeseed) oil, corn oil, coconut oil, cottonseed oil, olive oil, palm oil, peanut oil, and safflower oil. Soybean oil and corn oil are typically preferred vegetable oils. If used, the rubber composition preferably includes less than 10 phr of oil.

In an embodiment, the rubber composition includes silica. Commonly employed siliceous pigments which may be used in the rubber compound include for instance conventional pyrogenic and precipitated siliceous pigments (silica). In one embodiment, precipitated silica is used. The conventional siliceous pigments may be precipitated silicas such as, for example, those obtained by the acidification of a soluble silicate, e.g. sodium silicate. Such conventional silicas might be characterized, for example, by having a BET surface area, as measured using nitrogen gas. In one embodiment, the BET surface area may be in the range of 40 to 600 square meters per gram. In another embodiment, the BET surface area may be in a range of 50 to 300 square meters per gram. In the embodiments of the present invention, said surface area is preferably relatively high. The BET surface area is determined according to ASTM D6556 or equivalent and is described in the Journal of the American Chemical Society, Volume 60, Page 304 (1930).

In still another embodiment, the rubber composition may comprise pre-silanized and precipitated silica. In another embodiment, pre-silanized, or in other words pre-hydrophobated, precipitated silica utilized is hydrophobated prior to its addition to the rubber composition by treatment with at least one silane. Suitable silanes include but are not limited to alkylsilanes, alkoxysilanes, organoalkoxysilyl poly sulfides and organomercaptoalkoxysilanes. In another embodiment, said pre-silanized precipitated silica is precipitated silica pre-reacted with a silica coupler comprised of bis(3-triethoxysilylpropyl)polysulfide containing an average of from 1 to 5 connecting sulfur atoms (preferably 2 to 4) in its polysulfidic bridge or an alkoxyorganomercaptosilane. The mercaptosilane with its SH groups may improve compatibility with the rubber material or rubber matrix and/or support the curing process. Some non-limiting examples of pre-treated silicas (i.e. silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries.

In an embodiment, the rubber composition is exclusive of addition of (added) precipitated silica to the rubber composition (thereby exclusive of addition of non-pre-silanized precipitated silica).

In an embodiment, the rubber composition may include carbon black. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991 grades. These carbon blacks have iodine absorptions ranging from 9 g/kg to 145 g/kg and a DBP number ranging from 34 $cm^3/100$ g to 150 $cm^3/100$ g. Iodine absorption values can be suitably determined according to ASTM D1510 or equivalent.

In one embodiment, the rubber composition may contain sulfur containing organosilicon compounds or silanes. Examples of suitable sulfur containing organosilicon compounds are of the formula:

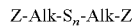
Z-Alk-$S_n$-Alk-Z         I in which Z is selected from the group consisting of

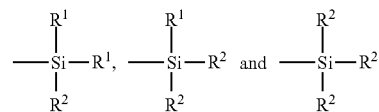

where $R^1$ is an alkyl group of 1 to 4 carbon atoms, cyclohexyl or phenyl; $R^2$ is an alkoxy of 1 to 8 carbon atoms, or cycloalkoxy of 5 to 8 carbon atoms; Alk is a divalent hydrocarbon of 1 to 18 carbon atoms and n is an integer of 2 to 8. In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

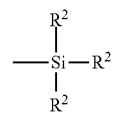

where $R^2$ is an alkoxy of 2 to 4 carbon atoms, alternatively 2 carbon atoms; Alk is a divalent hydrocarbon of 2 to 4 carbon atoms, alternatively with 3 carbon atoms; and n is an integer of from 2 to 5, alternatively 2 or 4. In another embodiment, suitable sulfur containing organosilicon compounds include compounds disclosed in U.S. Pat. No. 6,608,125. In one preferred embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials. In another embodiment, suitable sulfur containing organosilicon compounds include those disclosed in United States Patent Application Publication No. 2003/0130535. In one embodiment, the sulfur containing organosilicon compound is Si-363 from Degussa. The amount of the sulfur containing organosilicon compound in a rubber composition may vary depending on the level of other additives that are used.

It is readily understood by those having skill in the art that the rubber composition may be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Some representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may for instance be used in an amount ranging from 0.5 phr to 8 phr, alternatively within a range of 1.5 phr to 6 phr. Typical amounts of tackifier resins, if used, comprise for example 0.5 phr to 5 phr, usually 1 phr to 5 phr. However, in a preferred embodiment the composition is free of such tackifier resins. Typical amounts of antioxidants, if used, may for example comprise 1 phr to 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants, if used, may for instance comprise 1 phr to 5 phr. Typical amounts of fatty acids, if used, which can include stearic acid, may for instance comprise 0.5 phr to 3 phr. Typical amounts of waxes, if used, may for example comprise 1 phr to 5 phr. Often microcrystalline waxes are used. Typical amounts of peptizers, if used, may for instance comprise 0.1 phr to 1 phr. Typical peptizers may be, for example, pentachlorothiophenol and dibenzamidodiphenyl disulfide.

Accelerators may be preferably but not necessarily used to control the time and/or temperature required for vulcanization and to improve the properties of the vulcanizate. In one embodiment, a single accelerator system may be used, i.e. primary accelerator. The primary accelerator(s) may be used in total amounts ranging from 0.5 phr to 4 phr, alternatively 0.8 phr to 1.5 phr. In another embodiment, combinations of a primary and a secondary accelerator might be used with the secondary accelerator being used in smaller amounts, such as from 0.05 phr to 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are for instance amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be for instance a guanidine, dithiocarbamate or thiuram compound. Suitable guanidines include diphenylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients may be typically mixed in at least two stages, namely at least one nonproductive stage followed by a productive mix stage. The final curatives including sulfur-vulcanizing agents may be typically mixed in the final stage which is conventionally called the "productive" mix stage in which the mixing typically occurs at a temperature, or ultimate temperature, lower than the mix temperature(s) of the preceding nonproductive mix stage(s). The terms "nonproductive" and "productive" mix stages are well known to those having skill in the rubber mixing art. In an embodiment, the rubber composition may be subjected to a thermomechanical mixing step. The thermomechanical mixing step generally comprises a mechanical working in a mixer or extruder for a period of time, for example suitable to produce a rubber temperature between 140° C. and 190° C. The appropriate duration of the thermomechanical working varies as a function of the operating conditions, and the volume and nature of the components. For example, the thermomechanical working may be from 1 to 20 minutes.

In a second aspect of the present invention, a tire is provided, the tire comprising the rubber composition of the first aspect and/or one of its embodiments.

In one embodiment the tire has a tire tread comprising the rubber composition.

In another embodiment the tire is a summer tire.

In another embodiment, the tire of the present invention may for example be a pneumatic tire or nonpneumatic tire. The tire may also be a radial or bias ply tire. Preferably, the tire is a pneumatic radial tire.

In an embodiment, vulcanization of the pneumatic tire of the present invention may for instance be carried out at conventional temperatures ranging from 100° C. to 200° C. In one embodiment, the vulcanization is conducted at temperatures which are within a range of 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

It is emphasized that one or more aspects, embodiments, or features thereof, may be combined with one another within the scope of the present invention.

BRIEF DESCRIPTION OF THE DRAWINGS

The structure, operation, and advantages of the invention will become more apparent upon contemplation of the following description taken in conjunction with the accompanying drawing, wherein:

FIG. 1 is a schematic cross section of a tire comprising a tread and further rubber components.

DETAILED DESCRIPTION OF THE INVENTION

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The tread 10 comprises one or more tread compounds as described herein in accordance with embodiments of the invention.

While the embodiment of FIG. 1 suggests a plurality of tire components including for instance apexes 5, chippers 7, flippers 8, and an overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves. The present invention shall not be limited to the example of the tire 1 depicted and described in accordance with FIG. 1.

Preferred examples of a rubber composition, such as for a tire tread, which are in accordance with preferred embodiments of the invention are shown in the upper section of TABLE 1 as Inventive Examples 1 to 3 in comparison with a Comparative Example (not in accordance with the present invention). In the lower section of TABLE 1, test results are shown for tires having the different rubber compositions of the Comparative Example and the Inventive Examples in a tire tread of tires with same construction. The tire test results for rolling resistance, wet braking, dry braking and wet handling have been normalized to the respective performance of the Comparative Example.

As shown in the upper section of TABLE 1, the comparative sample comprises a low Tg solution polymerized styrene butadiene rubber in combination with a natural rubber. The rubber matrix of the Inventive Examples is based on a combination of a low Tg solution polymerized styrene butadiene rubber in combination with a high Tg solution polymerized styrene butadiene rubber. In particular, such a combination helps to achieve a higher compound Tg which supports an advanced wet performance. Moreover, having two SBRs with high Tg and low Tg helps to obtain a good abrasion resistance compared to the use of a single higher Tg rubber, in particular a high Tg SBR. Inventive Examples 1 and 2 comprise a silica with a higher surface area in comparison with the Comparative Example 1 and the Inventive Example 3. Moreover, all Inventive Examples include increased amounts of silane compared to the Comparative Example, which is deemed to further increase the rolling resistance performance in view of the utilized silane 1. While the Comparative Example relies on an aromatic modified petroleum hydrocarbon resin, the Inventive Examples use a terpene resin which has been found to further improve the rolling resistance performances. Moreover, it has been found that the low Mw of such resins helps to improve the wet performance and rolling resistance balance, in particular in the relatively high amounts used. Also, such a resin has a good miscibility whereas higher Mw resins may result in a phase separation which is deemed detrimental to rolling resistance performance. BDBzTH is not deemed to have an impact on the rolling resistance or wet and dry performances discussed herein but has rather been used with regards to advance wear properties, in particular to improve abrasion resistance. Remarkably, all Examples comprise limited amounts of oil (some including extension oil) which helps to improve tensile properties.

As shown in the lower section of TABLE 1, all three Inventive Examples result in improved rolling resistance test results. In addition the first and the third Inventive Example result also in better wet and dry braking performances, whereas Inventive Example 2 remains at the same level as the Comparative Example. Despite the advance wet and dry braking performance of the first and the third inventive examples, the wet handling performance of the first Inventive Example is on a lower level than the same performance of the Comparative Example 1. I n the present comparison only the third Inventive Example maintains also the wet handling performance on the same level as the Comparative Example. Overall, all inventive examples show an improved balance of rolling resistance combined with wet and dry braking performance.

TABLE 1

Rubber Compositions

| Ingredient | Comparative Example 1 | Inventive Example 1 | Inventive Example 2 | Inventive Example 3 |
|---|---|---|---|---|
| | phr | | | |
| SSBR[1] | 80 | 0 | 0 | 0 |
| Natural Rubber | 20 | 20 | 20 | 20 |
| SSBR[2] | 0 | 10 | 0 | 0 |
| SSBR[3] | 0 | 0 | 30 | 30 |
| SSBR[4] | 0 | 73.5 | 52.5 | 52.5 |
| Silica 1[5] | 0 | 125 | 110 | 0 |
| Silica 2[6] | 120 | 0 | 0 | 120 |
| Silane 1[7] | 12 | 15 | 13.2 | 14.4 |
| Silane 2[8] | 1 | 1 | 1 | 1 |
| Resin 1[9] | 38 | 0 | 0 | 0 |
| Resin 2[10] | 0 | 43 | 39 | 39 |
| BDBzTH[11] | 0 | 1.5 | 2.2 | 2.2 |
| Antidegradants[12] | 5.5 | 5.5 | 5.5 | 5.5 |
| Oil | 4 | 0 | 0 | 2 |
| Waxes | 2.25 | 2.25 | 2.25 | 2.25 |
| Sulfur | 0.8 | 0.8 | 0.6 | 0.6 |
| Accelerators[13] | 3.5 | 2.2 | 2.2 | 2.2 |
| Stearic Acid | 2.5 | 2.5 | 2.5 | 2.5 |
| Zinc soap | 2 | 2 | 2 | 2 |
| Zinc Oxide | 1.1 | 1 | 1.1 | 1.1 |
| Tire test results | | | | |
| Rolling | 100 | 104 | 107 | 106 |
| WET Braking[b] | 100 | 103 | 100 | 106 |
| DRY Braking[c] | 100 | 102 | 100 | 103 |
| WET Handling[d] | 100 | 93 | 95 | 100 |

[1]Thio-functionalized, solution-polymerized styrene butadiene rubber as SLR3402 from Trinseo, having a Tg of −62° C.
[2]Amino silane-functionalized, solution-polymerized styrene butadiene rubber as HPR355H from JSR, having a Tg of −27° C.
[3]Amino silane-functionalized, solution-polymerized styrene butadiene rubber as SOL 5251H from KKPC, havii ig a Tg of −34° C.
[4]Amino siloxane-functionalized, solution-polymerized styrene butadiene rubber as F1038 from LG Chem, having a Tg of −62° C., with 5% oil extension by weight
[5]Precipitated silica as Zeosil ™ Premium 200MP with a BET surface area of about 215 m²/g
[6]Precipitated silica as Zeosil ™ 1165 MP with a BET surface area of about 160 m²/g
[7]3-Octanoylthio-l-propyltriethoxysilane as NXT from Momentive
[7]Bis-triethoxysilylpropyl tetrasulfide as SI 69 from Evonik
[8]50% bis-triethoxysilylpropyl tetrasulfide on 50% N330 carbon black carrier, as X50S from Evonik
[9]Aromatic modified petroleum hydrocarbon resin as Oppera ™ PR373 from Exxon Mobile, having a weight average molecular weight of 1500 g/mol
[10]Alpha pinene based terpene resin as Dercolyte Al 15 from DRT, having a weight average molecular weight of about 600 g/mol
[11]1,6-bis(N,N-dibenzylthiocarbamoyldithio)hexane as Vulcuren ™ from Lanxess
[12]Mixed p-phenylene diamine type
[13]Sulfenamide and guanidine types
[a]Relative tire test results, normalized to Comparative Example 1 (higher is better)
[b]Relative tire test results, normalized to Comparative Example 1 (higher is better)
[c]Relative tire test results, normalized to Comparative Example 1 (higher is better)
[d]Relative tire test results, normalized to Comparative Example 1 (higher is better)

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims. In any case, the above described embodiments and examples shall not be understood in a limiting sense.

The invention claimed is:

1. A rubber composition comprising:
   70 phr to 90 phr of styrene butadiene rubber comprising a first styrene butadiene rubber having a glass transition temperature within a range of −49° C. to −15° C. and a second styrene butadiene rubber having a glass transition temperature within a range of −50° C. to −89° C.;
   10 phr to 30 phr of one or more of natural rubber and synthetic polyisoprene;
   100 phr to 200 phr of silica; and
   at least 25 phr of at least one terpene resin having a weight average molecular weight of at most 1000 g/mol.

2. The rubber composition according to claim 1 wherein the resin has a softening point within a range of 100° C. to 150° C. and a weight average molecular weight within a range of 500 g/mol to 1000 g/mol.

3. The rubber composition according to claim 1 wherein the resin is an alpha pinene based terpene resin.

4. The rubber composition according to claim 1 wherein the silica comprises a BET surface area within a range of 150 $m^2/g$ to 190 $m^2/g$.

5. The rubber composition according to claim 1 wherein the rubber composition comprises from 115 phr to 145 phr of the silica.

6. The rubber composition according to claim 1 further comprising one or more of:
   from 0.1 phr to 10 phr of carbon black;
   from 10 phr to 20 phr of silane;
   from 10 phr to 20 phr of a blocked mercapto silane; and
   from 0 phr to 9 phr of liquid plasticizers.

7. The rubber composition according to claim 1 comprising at most 9 phr of liquid plasticizers.

8. The rubber composition according to claim 1 further comprising from 11 phf to 15 phf of a blocked mercapto silane.

9. The rubber composition according claim 1 comprising from 1 phr to 7 phr of oil.

10. The rubber composition according to claim 1 wherein said styrene butadiene rubber comprises at least 10 phr more of the second styrene butadiene rubber than of the first styrene butadiene rubber, and at least 20 phr of the first styrene butadiene rubber.

11. The rubber composition according to claim 1 comprising 15 phr to 25 phr of natural rubber or synthetic polyisoprene.

12. The rubber composition according to claim 1 wherein one or more of the first styrene butadiene rubber and the second styrene butadiene rubber comprises at least one functional group configured for the coupling to the silica.

13. The rubber composition according to claim 1 wherein both of the first styrene butadiene rubber and the second styrene butadiene rubber comprise at least one functional group configured for the coupling to the silica.

14. The rubber composition according to claim 1 wherein one of the first styrene butadiene rubber and the second styrene butadiene rubber is end chain functionalized with an amino silane group at at least one of its ends, and wherein the other one of the first styrene butadiene rubber and the second styrene butadiene rubber is end chain functionalized, at least one of its ends, with an amino siloxane group.

15. The rubber composition of claim 1 wherein the first styrene butadiene rubber has a glass transition temperature within a range of −25° C. to −40° C. and the second styrene butadiene rubber has a glass transition temperature within a range of −55° C. and −69° C.

16. The rubber composition of claim 1 comprising from 30 phr to 50 phr of the resin.

17. The rubber composition of claim 1 wherein the glass transition temperature of the rubber composition is within a range of −25° C. and −15° C.

18. A tire comprising the rubber composition according to claim 1.

19. The tire of claim 18, wherein the tire comprises a tread including said rubber composition.

* * * * *